US012345268B2

(12) United States Patent
Scott, IV

(10) Patent No.: US 12,345,268 B2
(45) Date of Patent: Jul. 1, 2025

(54) MACHINE AND METHOD FOR VACUUM ASSISTED SERVICING OF A FLUID ENCLOSURE

(71) Applicant: Red Dog International L.P., Perryton, TX (US)

(72) Inventor: Oscar T. Scott, IV, Perryton, TX (US)

(73) Assignee: Red Dog Vac Trac LLC, Austin, TX (US)

( * ) Notice: Subject to any disclaimer, the term of this patent is extended or adjusted under 35 U.S.C. 154(b) by 75 days.

(21) Appl. No.: 18/077,329

(22) Filed: Dec. 8, 2022

(65) Prior Publication Data

US 2023/0193905 A1 Jun. 22, 2023

Related U.S. Application Data

(60) Provisional application No. 63/291,816, filed on Dec. 20, 2021.

(51) Int. Cl.

| | |
|---|---|
| ***F04D 25/02*** | (2006.01) |
| ***F04D 13/06*** | (2006.01) |
| ***F04D 19/00*** | (2006.01) |
| ***F04D 25/12*** | (2006.01) |
| ***F04D 29/40*** | (2006.01) |
| *F04F 3/00* | (2006.01) |

(52) U.S. Cl.

CPC ......... *F04D 25/026* (2013.01); *F04D 13/068* (2013.01); *F04D 25/12* (2013.01); *F04D 29/406* (2013.01); *F04D 19/002* (2013.01); *F04F 3/00* (2013.01); *F05D 2250/231* (2013.01); *F05D 2260/60* (2013.01)

(58) Field of Classification Search

USPC .......................................................... 137/139

See application file for complete search history.

(56) References Cited

U.S. PATENT DOCUMENTS 3,181,895 A * 5/1965 Cator .................... F16L 37/004 285/1
3,810,515 A * 5/1974 Ingro ..................... A63H 11/04 446/457

(Continued)

FOREIGN PATENT DOCUMENTS

CN 202981876 U * 6/2013
CN 106870981 A * 6/2017 ............. F21L 4/005

(Continued)

OTHER PUBLICATIONS

"Dirt Devil" product description (Obtained "https://www.amazon.com/Dirt-Devil-Cordless-Lightweight-BD30010/dp/B01LZNV0BG?th=1", May 2, 2024) (Year: 2024).*

(Continued)

*Primary Examiner* — Dominick L Plakkoottam
*Assistant Examiner* — Geoffrey S Lee
(74) *Attorney, Agent, or Firm* — Brian F. Russell

(57) ABSTRACT

A portable battery-powered vacuum pump includes a housing having an intake vent, an outlet, and a fan assembly including a fan. The vacuum pump includes a magnet having a holding strength great enough to resist terrestrial gravitational force acting on the vacuum pump, a battery, and a power and control circuit that selectively applies power from the battery to rotate the fan, such that gas is drawn into the intake vent and expelled from the outlet.

24 Claims, 4 Drawing Sheets

(56) References Cited

U.S. PATENT DOCUMENTS

| | | | | | |
|---|---|---|---|---|---|
| RE28,294 | E * | 1/1975 | Hansel | F16J 3/046 | 141/97 |
| 4,058,149 | A * | 11/1977 | Hansel | B67D 7/54 | 141/392 |
| 4,542,557 | A * | 9/1985 | Levine | A47L 5/24 | 15/353 |
| 4,678,014 | A * | 7/1987 | Owen | F04D 25/084 | 417/361 |
| 5,195,427 | A * | 3/1993 | Germano | B65B 31/047 | 206/524.8 |
| 5,320,148 | A * | 6/1994 | Asciutto | B67D 7/54 | 141/391 |
| 5,765,608 | A * | 6/1998 | Kristen | B65B 31/047 | 141/96 |
| 5,904,160 | A * | 5/1999 | Wright | A47L 5/24 | 15/352 |
| 6,282,749 | B1 * | 9/2001 | Tajima | A47L 9/0488 | 15/387 |
| 6,520,071 | B1 * | 2/2003 | Lanza | B65B 31/047 | 141/96 |
| 6,598,626 | B2 * | 7/2003 | Chaffee | F04D 25/084 | 141/114 |
| 6,971,417 | B2 * | 12/2005 | Deni | B65B 31/047 | 141/114 |
| 7,021,034 | B2 * | 4/2006 | Higer | B65B 31/00 | 53/512 |
| 7,246,757 | B2 * | 7/2007 | Juo | B05B 15/65 | 403/DIG. 1 |
| 8,726,534 | B2 * | 5/2014 | Chappell | F26B 9/003 | 34/232 |
| 9,695,545 | B2 * | 7/2017 | Goble | A47L 9/242 | |
| 10,145,057 | B2 * | 12/2018 | Goble | A47L 9/2857 | |
| 10,767,303 | B2 * | 9/2020 | Goble | D06F 58/22 | |
| 2007/0209326 | A1 * | 9/2007 | Tretina | F04C 25/00 | 53/434 |
| 2008/0227379 | A1 * | 9/2008 | Hung | F04D 29/601 | 411/378 |
| 2011/0041830 | A1 * | 2/2011 | Mahloch | F24C 15/00 | 126/21 A |
| 2011/0197464 | A1 * | 8/2011 | Chappell | F26B 9/003 | 34/232 |
| 2013/0255029 | A1 * | 10/2013 | Wolfe, Jr. | A47L 5/24 | 15/344 |
| 2016/0355972 | A1 * | 12/2016 | Goble | A47L 9/2857 | |
| 2017/0268157 | A1 * | 9/2017 | Goble | A47L 9/0673 | |
| 2019/0119845 | A1 * | 4/2019 | Goble | A47L 9/0673 | |

FOREIGN PATENT DOCUMENTS

| | | | |
|---|---|---|---|
| CN | 206409936 | U * | 8/2017 |
| DE | 3814962 | A1 * | 11/1989 |
| GB | 860882 | A * | 12/1958 |
| JP | H0516528 | * | 8/1991 |
| KR | 1325933 | B1 * | 11/2013 |

OTHER PUBLICATIONS

Machine Translation of Hoshino, JP H0516528 (Obtained from USPTO Search) (Year: 2024).*

Definition of Resist (obtained from https://www.merriam-webster.com/dictionary/resist, Oct. 30, 2024) (Year: 2024).*

Machine Translation CN106870981 (Obtained from USPTO Search) (Year: 2024).*

Machine Translation of CN202981876 (Obtained from USPTO Search) (Year: 2024).*

Machine Translation of CN206409936 (Obtained from USPTO Search) (Year: 2024).*

Machine Translation of KR1325933 (Obtained from USPTO Search) (Year: 2024).*

Machine Translation of DE3814962 (Obtained from USPTO Search) (Year: 2024).*

Machine Transcript of video from Webpage, Amesi youtube webpage "Using a Vacuum Cleaner to change a leaking drain plug gasket" (Obtained on Mar. 21, 2025 from https://www.youtube.com/watch?v=Kp1SpNpXwIE) (Year: 2025).*

Webpage, Amesi youtube video "Using a Vacuum Cleaner to change a leaking drain plug gasket" (Obtained on Mar. 21, 2025 from https://www.youtube.com/watch?v=Kp1SpNpXwIE) (Year: 2017).*

* cited by examiner

MACHINE AND METHOD FOR VACUUM ASSISTED SERVICING OF A FLUID ENCLOSURE

BACKGROUND OF THE INVENTION

The present disclosure is generally directed to mechanical systems. Still more particularly, the present disclosure is directed to a device and method for vacuum-assisted servicing of a fluid enclosure.

As is known in the art, hydraulic systems are incorporated within many different types of machinery, including without limitation passenger vehicles, farm and ranch equipment (e.g., tractors, combine harvesters, etc.), construction and paving equipment (e.g., excavators, bulldozers, graders, pavers, etc.), logging equipment, manufacturing and material processing equipment (e.g., steel processing equipment), and robotic equipment. Hydraulic systems employ Pascal's Law to transmit pressure via an incompressible liquid fluid contained within an enclosed volume. The liquid fluid employed in a hydraulic system (referred to herein generally as "hydraulic fluid") is typically some type of oil. In various applications, the pressure transmitted by the hydraulic system through the hydraulic fluid can be utilized to move machinery components (often via hydraulic cylinders) and/or to apply force using machinery components.

Hydraulic systems, like other mechanical systems, require maintenance and repairs. To perform the maintenance and/or repairs, the enclosed volume containing the hydraulic fluid often must be opened, which can lead to a loss of at least a portion of the hydraulic fluid from the enclosed volume, and possibly, the contamination of the surrounding environment. For example, one common maintenance procedure required for some hydraulic systems is to periodically replace a fluid filter utilized to remove contaminants from the hydraulic fluid. Replacement of the fluid filter commonly results in a significant amount of the hydraulic fluid spilling out of the opening by which hydraulic fluid circulates through the fluid filter in the time interval between removal of the old fluid filter and installation of the new fluid filter.

BRIEF SUMMARY

In view of the foregoing, the present disclosure appreciates that it would be useful and desirable to reduce or eliminate the loss of liquid fluid from an enclosure of a mechanical system during servicing. This is true not only for hydraulic systems, but also for systems that include one or more enclosures for alternative or additional liquid fluids, such as lubricating oil and coolant/anti-freeze. As a result, the time required for servicing the system can be reduced and/or the financial cost resulting from loss of liquid fluid from the enclosure can be reduced or eliminated and/or environmental contamination resulting from loss of liquid fluid from the enclosure can be reduced or eliminated.

In at least some embodiments, the loss of liquid fluid from an enclosure during servicing and/or repair of a mechanical system can be reduced through the use of a vacuum pump to apply a negative pressure on the liquid fluid within the enclosure.

In at least one embodiment, a suitable portable battery-powered vacuum pump includes a housing having an intake vent, an outlet, and a fan assembly including a fan. The vacuum pump includes one or more magnets having a holding strength great enough to resist terrestrial gravitational force acting on the vacuum pump, a battery, and a power and control circuit that selectively applies power from the battery to rotate the fan, such that gas is drawn into the intake vent and expelled from the outlet.

DETAILED DESCRIPTION

Figure 1:
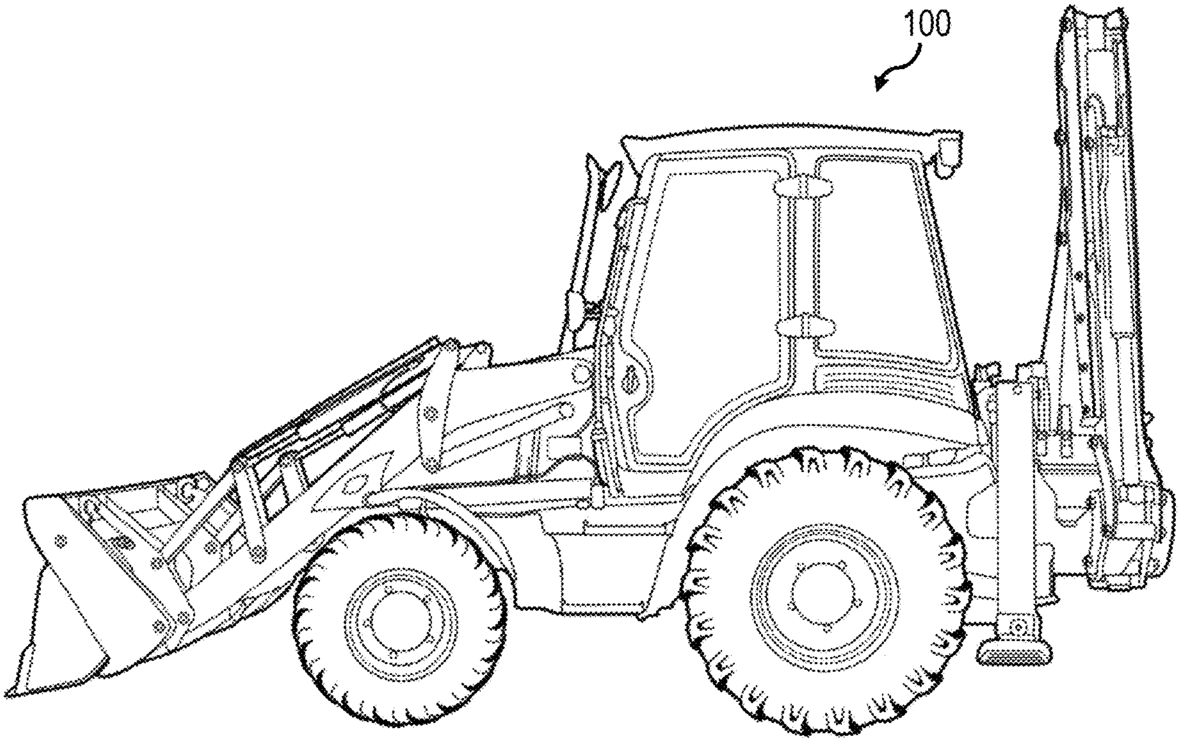
Fig. 1 PRIOR ART
FIG. 1 illustrates an example of machinery including an enclosure for a liquid fluid in accordance with one embodiment.

With reference to the figures and with particular reference to FIG. 1, there is illustrated a prior art example of machinery including a system having an enclosure for a liquid fluid. As described in detail herein, the loss of liquid fluid from the enclosure during servicing and/or repair of the system can be reduced or eliminated through use of a vacuum pump as described herein.

Machine 100 of FIG. 1 can be, for example, a conventional tractor and can include one or more systems having enclosures for liquid fluid. As one example, machine 100 can include one or more hydraulic systems utilized, for example, for propulsion of machine 100 and/or to control movement of one or more components of machine 100. Such hydraulic systems typically include one or more reservoirs or other enclosures that hold hydraulic fluid. A machine 100 may include alternative or additional system(s) having enclosure(s) for a liquid fluid. For example, a machine 100 can include lubrication and/or cooling systems, each of which typically includes one or more enclosures for a liquid fluid. Although a specific example of a machine 100 is given in FIG. 1, those skilled in the art will appreciate that a vacuum pump in accordance with the disclosed embodiments may be utilized in the servicing of a wide variety of machines having enclosures for liquid fluid.

Figure 2:
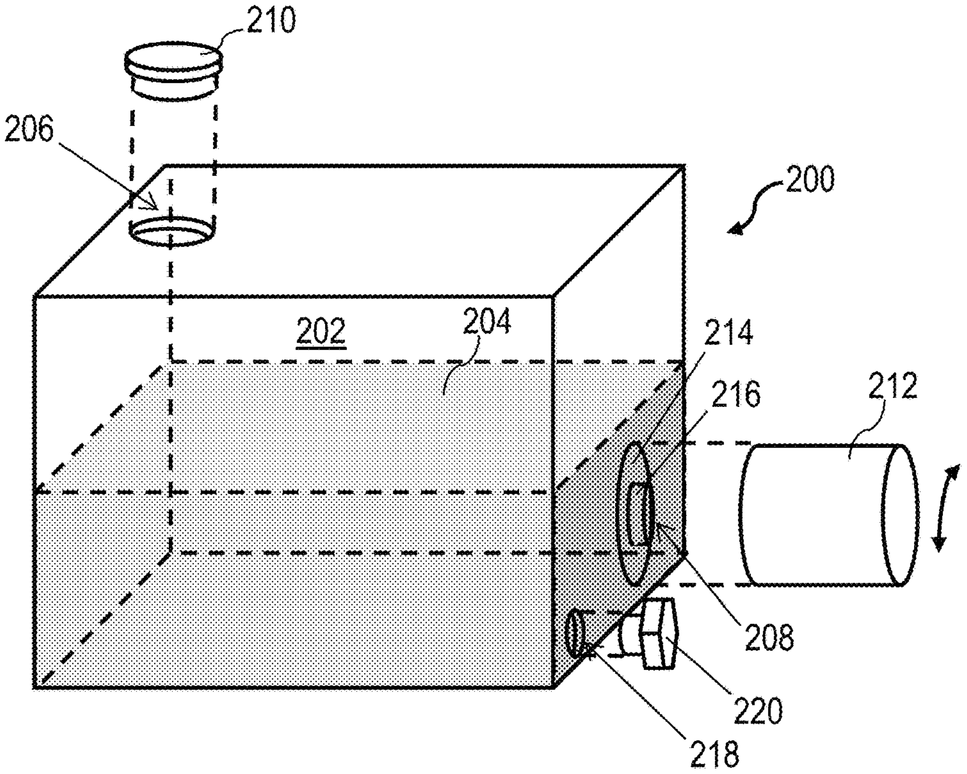
Fig. 2 PRIOR ART
FIG. 2 is a simplified view of an enclosure for liquid fluid in accordance with one embodiment.

FIG. 2 is a simplified view of an enclosure 200 for liquid fluid in accordance with one embodiment. Enclosure 200 may be, for example, an enclosure for liquid fluid of a hydraulic system, lubrication system, or cooling system of machine 100 of FIG. 1. Thus, in the various embodiments, enclosure 200 may be, for example, a power take off (PTO) gear box housing, hydraulic fluid reservoir, transmission housing, transmission oil pan, hydraulic cylinder, hydraulic pump, engine crankcase, engine oil pan, radiator, radiator overflow tank, etc. During normal use of the associated system, the interior volume of enclosure 200 is at least partially filled with liquid fluid 204 (e.g., hydraulic fluid, lubricating oil, coolant, etc.). The portion of the interior volume of enclosure 200 not filled with liquid fluid 204 is filled with a gas 202 (e.g., air).

Enclosure 200 has multiple openings. In the illustrated example, these openings include a fill opening 206, one or more filter openings shown generally at reference numeral 208, and a drain opening 218. Enclosure 200 will generally have alternative or additional openings, for example, to permit passage of fluid to and/or from enclosure 200 or to facilitate checking the level of liquid fluid 204 in enclosure 200 (e.g., a port for a dipstick). In general, at least one first opening of enclosure 200 (e.g., fill opening 206) provides access to a gas 202 (e.g., air) that fills the portion of the interior volume of enclosure 200 that is not filled by liquid fluid 204, and at least one second opening of enclosure 200 (e.g., drain opening 218 or filter opening(s) 208) providing access into the interior of enclosure 200 below the fill level of liquid fluid 204.

During normal operation of the associated system, fill opening 206 is closed by a fill cap 210, which may be retained in fill opening 206, for example, by interference fit or by threaded engagement between fill cap 210 and the interior surface of fill opening 206. Similarly, during normal operation of the associated system, drain opening 218 is closed by a drain plug 220, which may be retained in drain opening 218, for example, by interference fit or by threaded engagement between drain plug cap 220 and the interior surface of drain opening 218. During normal operation of the associated system, liquid fluid 204 circulates through fluid filter 212 via filter opening(s) 208. Fluid filter 212 is removably sealed against filter bracket 214, for example, by engagement between a threaded exterior surface of post 216 and a corresponding threaded interior surface of filter 212, to prevent escape of liquid fluid 204 via filter opening(s) 208.

As noted above, mechanical systems, such as hydraulic systems, lubrication systems, and cooling systems, require periodic and/or episodic maintenance and/or repair. For example, fluid filter 212 has a limited useful life, and equipment manufacturers typically recommend fluid filter 212 to be replaced at regular service intervals (e.g., denominated in chronological time, distance of travel, and/or hours of equipment operation). Manufacturers likewise recommend that liquid fluid 204 be periodically replaced. However, in some cases, the service intervals of fluid filter 212 and liquid fluid 204 differ, meaning that it would be desirable to replace fluid filter 212 without draining liquid fluid 204 from enclosure 200. Those skilled in the art appreciate that many other service or repair scenarios will arise in which a technician will remove a component that covers one of the second openings of enclosure 200 (e.g., drain plug 220 or fluid filter 212) and would desire to do so without allowing liquid fluid 204 to drain through the second opening under the urging of gravity and/or the gas over-pressure within enclosure 200.

Figure 3:
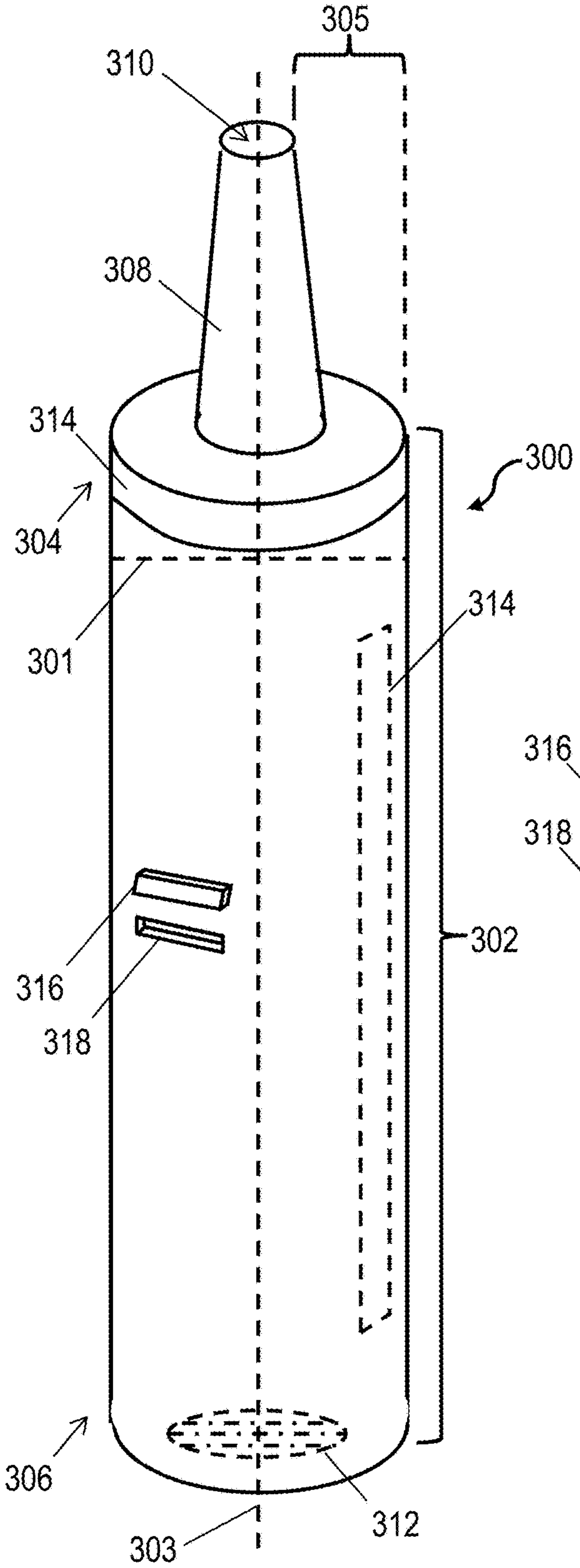
FIG. 3 illustrates an exemplary vacuum pump adapted for use in servicing a mechanical system having an enclosure for liquid fluid in accordance with one embodiment.

With reference now to FIG. 3, there is illustrated an exemplary vacuum pump 300 adapted for use in servicing a mechanical system having an enclosure for liquid fluid in accordance with one embodiment. Vacuum pump 300 includes a housing 302, which in the depicted embodiment is an elongate, substantially cylindrical housing having a proximal end 304 and a distal end 306. In this example, housing 302 may have an overall length of between about 100 mm and 400 mm, and more preferably, between about 100 mm and 300 mm, and still more preferably, between about 100 mm and 185 mm. At proximal end 304, housing 302 may have a diameter 301 orthogonal to its long axis 303 of between about 50 mm and 150 mm, and more preferably, between about 50 mm and 100 mm, and still more preferably, between about 50 mm and 75 mm. In other embodiments, housing 302 may take other forms. For example, in some embodiments, housing 302 may not be radially symmetric. However, smaller ranges of dimensions are generally preferred to prevent interference between housing 302 and components of a machine 100 being serviced or repaired. As one particular example, in some machines 100, a fill opening 206 and a dipstick port are disposed in close proximity. As a result, for such machines 100, it would be preferred for a minimum distance 305 between inlet 310 and an edge of housing 302 to be less than about 45 mm so that inlet 310 can be placed over or through fill opening 206 without interference between housing 302 and the dipstick and/or dipstick tube.

Vacuum pump 300 has an inlet 310 through which air or other gas is drawn into vacuum pump 300. Air drawn into vacuum pump 300 via inlet 310 is expelled via an outlet 312 in distal end 306 of housing 302. In some embodiments, inlet 310 is disposed at proximal end 304 of housing 302. In the depicted example, however, inlet 310 is disposed on an optional intake extension 308 that extends or protrudes from housing 302 and can be inserted within fill opening 206 or another first opening in enclosure 200. Although FIG. 3 illustrates a particular embodiment in which intake extension 308 has a generally frusto-conical form, in other embodiments intake extension 308 may have other forms. For example, in other embodiments, the intake extension may comprise a hose or tube and may further be selectively uninstalled from or installed on housing 302 and/or intake extension 308. In various embodiments, intake extension 308 may be flexible, semi-flexible, or rigid. In some embodiments, intake extension 308 preferably has an outer diameter of about 45 mm or less and, more preferably, about 25 mm or less.

Figure 7:
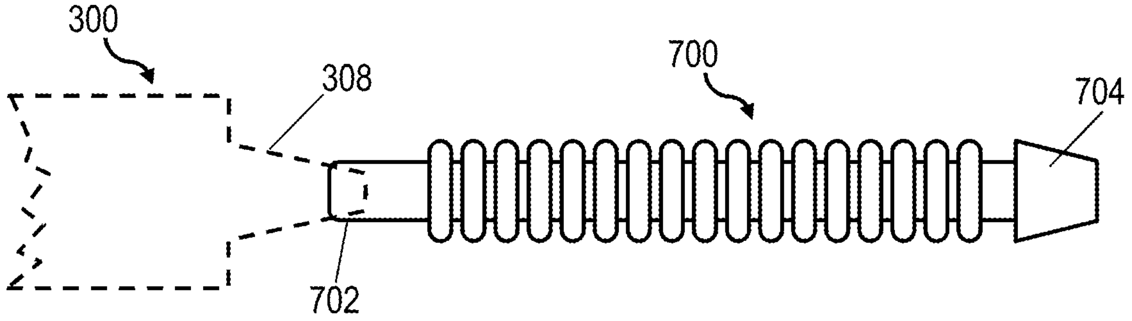
FIG. 7 illustrates an exemplary embodiment of an intake extension in accordance with one embodiment.

FIG. 7 illustrates an exemplary embodiment in which the intake extension includes the generally frusto-conical intake extension 308 of FIG. 3 and further includes a selectively separable flexible, expandable, corrugated tube 700. Tube 700 has a first end 702 configured to receive and retain therein the proximal end of intake extension 308, for example, by interference fit, and a second end 704. Second end 704 is configured to be received and retained in fill opening 206 or another first opening in enclosure 200. In some implementations, second end 704 may be formed of a rigid or semi-rigid material such as a plastic; in other implementations, second end 704 may be formed of a more flexible material, such as a rubber or elastomer.

In the embodiment of FIG. 3, housing 302 includes at least one magnet 314. In some embodiments, a magnet 314 is disposed adjacent to, or more preferably, surrounding inlet 310. In some embodiments, at least one magnet 314 can alternatively or additionally be disposed on a sidewall of housing 302. In one example, magnet 314 may be a neodymium ring magnet. In other embodiments, magnet 314 can be a selectively energized electromagnet. In such embodiments, magnet 314 may be energized to provide a magnetic field while vacuum pump 300 is operating and may be de-energized otherwise. In applications in which enclosure 200 or another portion of machine 100 is formed of a ferrous material (e.g., steel), magnet(s) 314 permits housing 302 to be conveniently and removably magnetically secured to enclosure 200 or other portion of machine 100 during servicing of a mechanical system, as described further below with reference to FIGS. 5-6. It is preferred if magnet 314 has a holding strength great enough to support the weight of an otherwise unsupported vacuum pump 300 (i.e., resist terrestrial gravitational force of about 9.8 $m/s^2$).

In some embodiments, housing 302 and/or intake extension 308 may include one or more alternative or additional magnets to facilitate magnetically securing housing 302 and/or intake extension 308 in a convenient position while servicing and/or repairing a mechanical system of a machine 100.

In the depicted example, vacuum pump 300 additionally includes a power switch 316 that enables a user to selectively turn on and turn off the vacuum applied by vacuum pump 300. In addition, vacuum pump 300 may include an optional power port 318 supporting the electrical connection of vacuum pump 300 to an external power source. In some examples, power port 316 may be compliant with one or more of the Universal Serial Bus (USB) standards.

Figure 4:
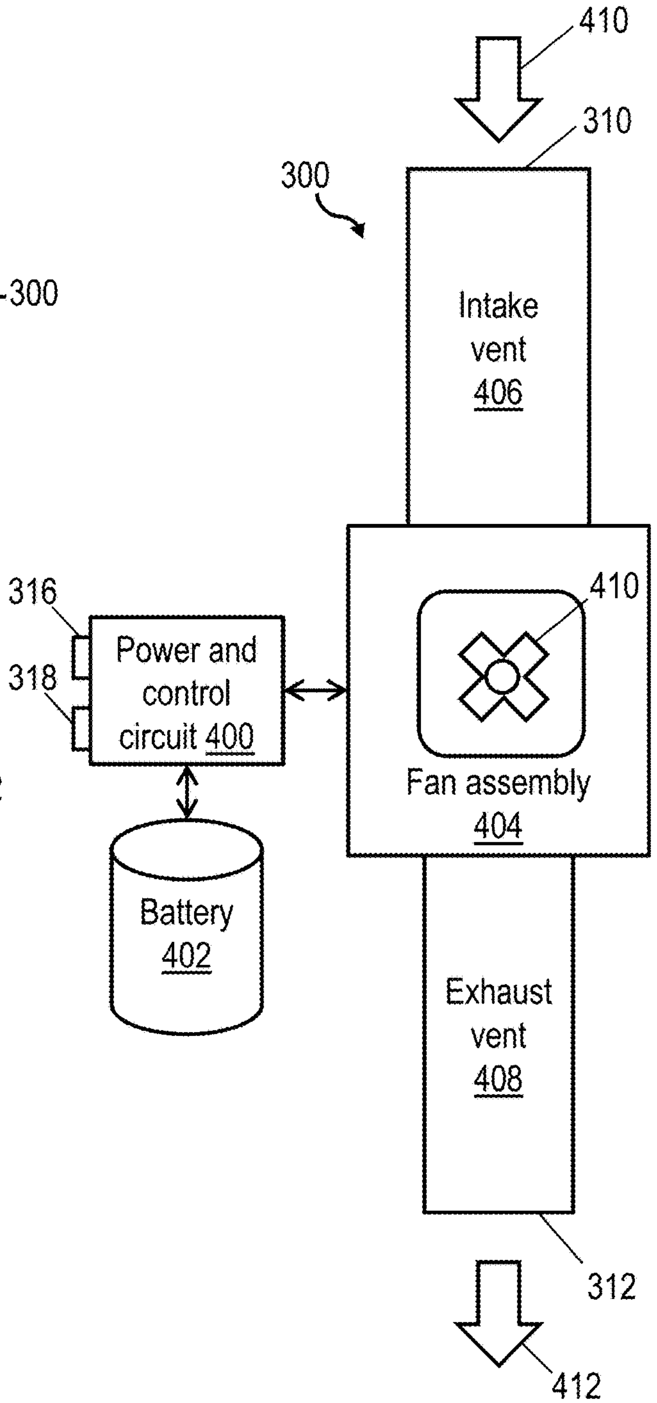
FIG. 4 is a schematic diagram of internal components of the exemplary vacuum pump of FIG. 3.

Referring now to FIG. 4, there is depicted a schematic diagram of internal components of the exemplary vacuum pump 300 of FIG. 3 in accordance with one embodiment. In this example, housing 302 of vacuum pump houses a power and control circuit 400, which is coupled to power switch 314, optional power port 318, and battery 402. In embodiments including optional power port 318, battery 402 can be implemented with a rechargeable battery, and power and control circuit 400 can charge battery 402 utilizing power supplied via power port 318. In embodiments omitting power port 318, battery 402 can alternatively be implemented with one or more replaceable batteries, such as D-cell batteries. In some embodiments, battery 402 provides at least about 2000 mAh of power, and more preferably, at least about 4000 mAh of power.

Vacuum pump 300 additionally includes a fan assembly 404, an intake vent 406, and an exhaust vent 408. Intake vent 406 is in fluid communication with inlet 310, and exhaust vent 408 is in fluid communication with outlet 312. In some embodiments, intake vent 406 and/or exhaust vent 408 may be at least partially formed by an interior surface of housing 302. In response to user actuation of power switch 314, power and control circuit 400 applies power from battery 402 to rotate a fan 410 within fan assembly 404. As indicated by arrows 410, 412, rotation of fan 410 causes a gas (e.g., air) to be drawn into vacuum pump 300 through inlet 310, intake vent 406, and fan assembly 404 and expelled or exhausted from exhaust vent 408 and outlet 312. In at least some embodiment, fan assembly 404 supports multiple fan speeds providing differing levels of vacuum. In some embodiments, fan assembly 404 is capable generating air flow of 3.33 1/s in at least one operating mode, and more preferably, at least about 6.5 1/s in at least one operating mode. In some embodiments, fan assembly 404 is capable of producing during open flow operation at least about 2000 Pa of pressure in at least one operating mode, and more preferably, at least about 4500 Pa of pressure in at least one operating mode.

Figure 5:
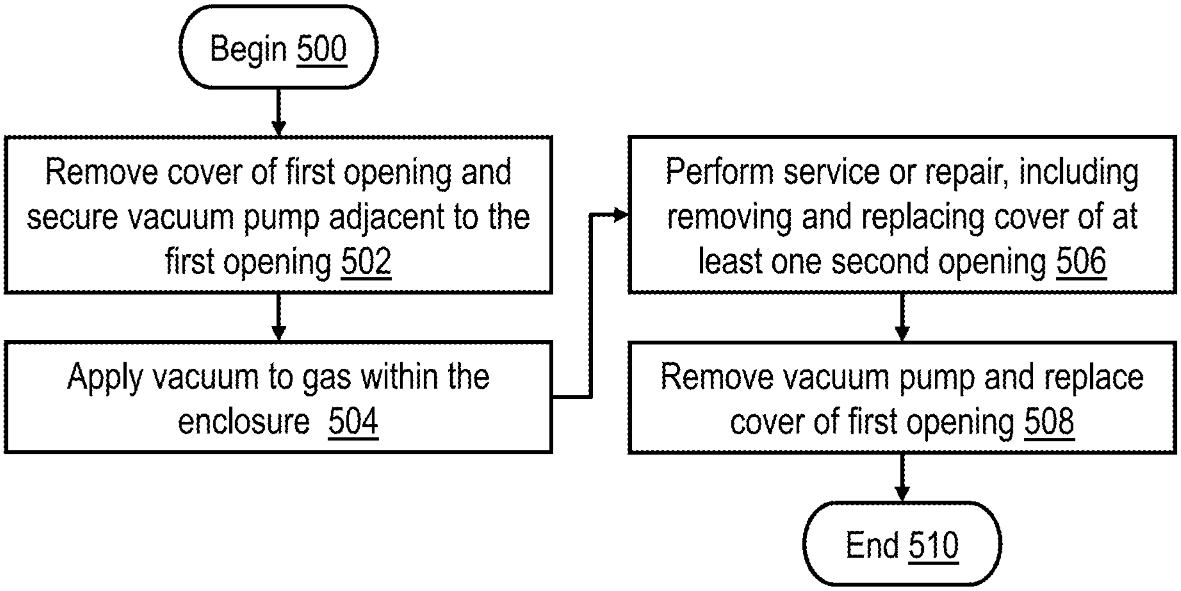
FIG. 5 is a high-level logical flowchart of an exemplary method of vacuum-assisted servicing of a mechanical system in accordance with one embodiment.
Figure 6:
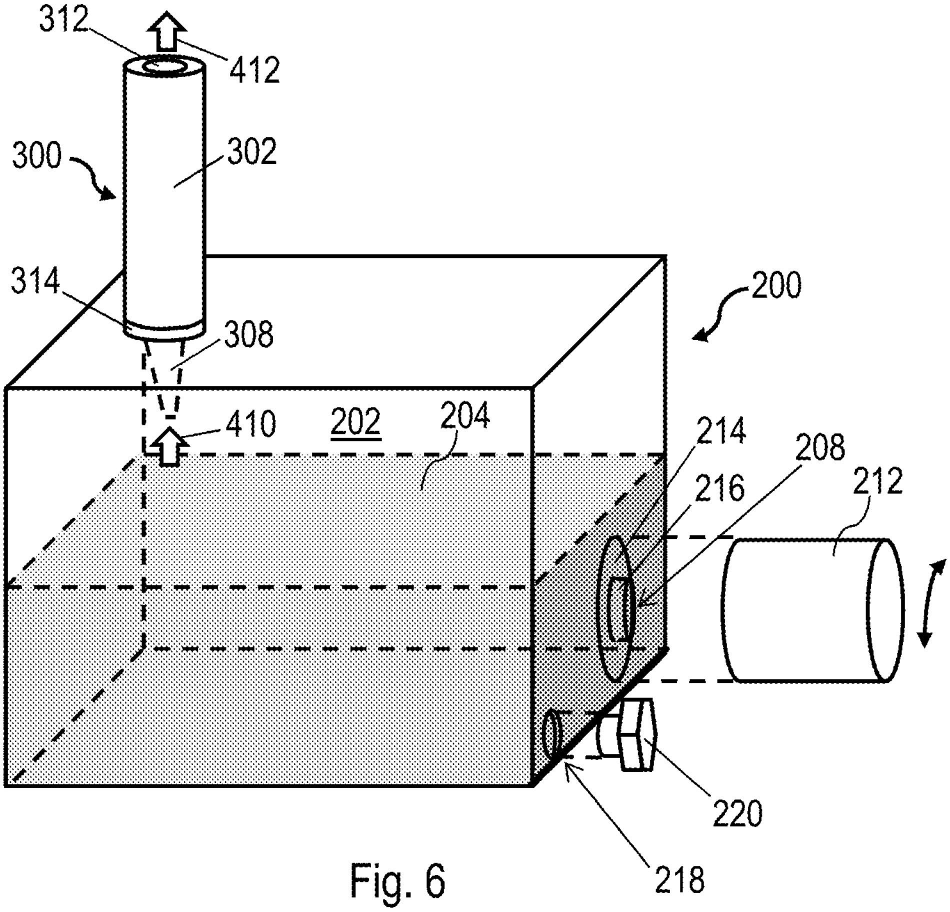
FIG. 6 depicts use of the vacuum pump of FIG. 3 to retain liquid fluid within an enclosure while servicing a mechanical system in accordance with one embodiment.

With reference now to FIG. 5, there is illustrated a high-level logical flowchart of an exemplary method of vacuum-assisted servicing of a mechanical system in accordance with one embodiment. For ease of understanding, FIG. 5 is described with additional reference to the schematic diagram depicted in FIG. 6.

The process of FIG. 5 begins at block 500 and then proceeds to block 502, which illustrates a user removing a cover of a first opening (e.g., fill opening 206 or a dipstick port or ventilation port) of an enclosure 200 that provides access to a gas-filled portion of the interior volume of the enclosure 200. In addition, at block 502, the user secures a vacuum pump 300 adjacent to the first opening. In some embodiments in which magnet 314 is a ring magnet, vacuum pump 300 can be magnetically secured to the mating face of enclosure 200 surrounding the first opening. In other embodiments, vacuum pump 300 can be magnetically secured in proximity to the first opening, for example, by magnetically attaching vacuum pump 300 to enclosure 200 or another component of machine 100. In embodiments in which vacuum pump 300 includes an intake extension 308, intake extension 308 can be placed at first opening or inserted through the first opening into the portion of the interior volume of enclosure 200 containing gas 202. In some embodiments, intake extension 308 can be magnetically secured to enclosure 200 or threadedly engaged with the first opening.

It should be noted that a substantially air-tight seal between vacuum pump 300 and enclosure 200 is not required in many applications. Thus, the vacuum applied by vacuum pump 300 can be a lossy or partial vacuum in that ambient air is allowed to return to the interior volume of enclosure 200 through the first opening and/or other opening (s) of enclosure 200 while vacuum pump 300 is operating.

The process of FIG. 5 proceeds from block 502 to block 504, which illustrates the user utilizing power switch 316 to turn on vacuum pump 300 and energize fan assembly 404. As fan 410 in fan assembly 404 rotates, fan assembly 404 extracts gas 202 from enclosure 200 and thus applies negative pressure (vacuum) to liquid fluid 204. The negative pressure applied by vacuum pump 300 is preferably sufficient to retain liquid fluid 204 within enclosure 200 even if one or more second openings below the fill level of liquid fluid 204 are opened in the course of servicing and/or repairing an associated system of machine 100.

Next, block 506 depicts the user performing service or repair on a system of machine 100 with vacuum applied. The service or repair includes removal of a cover of at least one second opening below the fill level of liquid fluid 204. For example, performing the service and/or repair may include removing drain plug 220 and/or fluid filter 212. A cover of the at least one second opening is thereafter replaced over the second opening (e.g., a new replacement fluid filter 212 is installed or drain plug 220 is reinstalled). Following block 506, the user removes vacuum pump 300 from the first opening and replaces the cover over the first opening (block 508). The process of FIG. 5 thereafter ends at block 510.

As has been described, a portable battery-powered vacuum pump includes a housing having an intake vent, an outlet, and a fan assembly including a fan. The vacuum pump includes a magnet having a holding strength great enough to resist terrestrial gravitational force acting on the vacuum pump, a battery, and a power and control circuit that selectively applies power from the battery to rotate the fan, such that gas is drawn into the intake vent and expelled from the outlet.

In the present description, the use of a singular term, such as, but not limited to, “a”, is not intended as limiting of the number of items. Further, the term “about” means the stated value plus or minus 10%. References to an “embodiment” or “embodiments” herein do not necessarily refer to the same embodiment(s), and features of various embodiments can be combined and/or substituted, as known to those skilled in the art.

The figures described above and the written description of specific structures and functions are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms.

What is claimed is:

1. A portable battery-powered vacuum pump, comprising:
an elongate housing having proximal and distal ends and a long axis extending between the proximal and distal ends, wherein the housing includes first and second surfaces, an inlet, and an outlet, wherein the first surface forms a sidewall of the housing disposed between the proximal and distal ends, the second surface is at the proximal end and is formed at an angle to the first surface, and the inlet is formed through the second surface, wherein the long axis is orthogonal to the second surface and the second surface forms a maximum extension of the housing along the long axis;
a fan assembly disposed within the housing, the fan assembly including a fan;
a battery disposed within the housing;
a power and control circuit disposed within the housing, wherein the power and control circuit is configured to selectively apply power from the battery to rotate the fan, such that gas is drawn into the inlet and expelled from the outlet; and
a magnet disposed on the second surface in which the inlet is formed, wherein:
the magnet surrounds the inlet;
the magnet is configured to fixedly secure the second surface of the housing in direct contact with a mating face of an enclosure containing the gas such that the inlet is in fluid communication with an interior of the enclosure; and
the magnet exerts magnetic force great enough to support an entire weight of the vacuum pump subject to terrestrial gravitational force.

2. The vacuum pump of claim 1, further comprising:
an intake extension, wherein:
the intake extension includes a tube; and
the intake extension is configured to extend from the housing and to be coupled to the housing in fluid communication with the inlet such that the gas is drawn through the tube into the inlet.

3. The vacuum pump of claim 2, wherein:
the magnet is a first magnet; and
the vacuum pump further comprises a second magnet on the intake extension.

4. The vacuum pump of claim 2, wherein the intake extension has a generally frusto-conical form with an opening formed there through.

5. The vacuum pump of claim 2, wherein the intake extension is configured to be selectively installed on and uninstalled from the housing.

6. The vacuum pump of claim 1, wherein the housing has a length of less than about 300 mm.

7. The vacuum pump of claim 1, wherein:
a distance between the inlet and an edge of the housing at which the first and second surface adjoin as measured orthogonal to the long axis is less than about 45 mm.

8. The vacuum pump of claim 1, further comprising a power port for charging the battery.

9. The vacuum pump of claim 1, wherein the fan assembly produces at least about 2000 Pa of pressure in operation.

10. The vacuum pump of claim 1, wherein the first and second surfaces are substantially orthogonal.

11. The vacuum pump of claim 1, wherein:
the magnet is a first magnet; and
the vacuum pump further comprises one or more second magnets on the first surface, wherein the one or more second magnets have a holding strength great enough to support the entire weight of the vacuum pump subject to terrestrial gravitational force.

12. The vacuum pump of claim 1, wherein:
the second surface is substantially orthogonal to the long axis and to the first surface.

13. The vacuum pump of claim 12, wherein the elongate housing is substantially cylindrical.

14. The vacuum pump of claim 1, wherein the magnet comprises a neodymium magnet.

15. The vacuum pump of claim 14, wherein the magnet comprises a ring magnet.

16. The vacuum pump of claim 1, wherein the magnet is substantially planar.

17. The vacuum pump of claim 1, wherein the outlet is formed in the distal end.

18. A method of servicing a system including an enclosure having first and second openings and containing a gas and a liquid fluid, the method comprising:
providing a portable battery-powered vacuum pump, including:
a housing having a first surface forming a sidewall, a second surface formed at an angle to the first surface, an inlet formed in the second surface, and an outlet;
a fan assembly disposed within the housing, the fan assembly including a fan;
a battery disposed within the housing;
a power and control circuit disposed within the housing, wherein the power and control circuit is configured to selectively apply power from the battery to rotate the fan, such that gas is drawn into the inlet and expelled from the outlet; and
a magnet disposed on the second surface in which the inlet is formed, wherein the magnet surrounds the inlet and exerts magnetic force great enough to secure the housing to a mating face of the enclosure and to support an entire weight of the vacuum pump subject to terrestrial gravitational force;
positioning the vacuum pump with the inlet in fluid communication with the first opening and the magnet magnetically secured to the mating face;
operating the vacuum pump such that gas from the enclosure is drawn through the first opening into the inlet of the vacuum pump;
while operating the vacuum pump, removing a cover of the second opening in the enclosure, wherein the second opening is in fluid communication with the liquid fluid; and
thereafter, covering the second opening in the enclosure and discontinuing operating the vacuum pump.

19. The method of claim 18, wherein:

the vacuum pump includes an intake extension in fluid communication with the inlet, wherein the intake extension extends from the housing; and the positioning includes inserting the intake extension into a gas-filled portion of the enclosure.

20. The method of claim 19, wherein the intake extension has a generally frusto-conical form.

21. The method of claim 18, wherein the housing has a length of less than about 300 mm.

22. The method of claim 18, wherein:

the housing is an elongate housing having a long axis;

a distance between the inlet and an edge of the housing at which the first and second surface adjoin as measured orthogonal to the long axis is less than about 45 mm.

23. The method of claim 18, wherein:

the vacuum pump includes a power port for charging the battery; and the method further comprises charging the battery via the power port.

24. The method of claim 18, wherein operating the vacuum pump includes applying at least about 2000 Pa of pressure utilizing the vacuum pump.

* * * * *